US012503877B2

(12) United States Patent
Tang et al.

(10) Patent No.: US 12,503,877 B2
(45) Date of Patent: Dec. 23, 2025

(54) ROBOTIC POOL CLEANER

(71) Applicant: Suzhou Smorobot Technology Co., Ltd., Suzhou (CN)

(72) Inventors: Jie Tang, Beijing (CN); Yaming Tang, Beijing (CN)

(73) Assignee: Suzhou Smorobot Technology Co., Ltd. (CN)

( * ) Notice: Subject to any disclaimer, the term of this patent is extended or adjusted under 35 U.S.C. 154(b) by 0 days.

(21) Appl. No.: 19/067,866

(22) Filed: Mar. 1, 2025

(65) Prior Publication Data

US 2025/0198188 A1 Jun. 19, 2025

Related U.S. Application Data

(63) Continuation of application No. PCT/CN2023/116360, filed on Aug. 31, 2023, which is a continuation of application No. 17/901,742, filed on Sep. 1, 2022, now Pat. No. 11,649,651, which is a continuation-in-part of application No. PCT/CN2022/075664, filed on Feb. 9, 2022.

(51) Int. Cl.
*E04H 4/16* (2006.01)
*B62D 55/12* (2006.01)
*B62D 55/30* (2006.01)

(52) U.S. Cl.
CPC ........... *E04H 4/1654* (2013.01); *B62D 55/12* (2013.01); *B62D 55/30* (2013.01); *E04H 4/1636* (2013.01)

(58) Field of Classification Search
CPC ........ E04H 4/16; E04H 4/1636; E04H 4/1654
See application file for complete search history.

(56) References Cited

U.S. PATENT DOCUMENTS 9,119,463 B2 * 9/2015 Gopalan ............... E04H 4/1654
2009/0276967 A1 * 11/2009 Hui ....................... E04H 4/1654 180/337

(Continued)

FOREIGN PATENT DOCUMENTS

CN 101481957 A 7/2009
CN 208152635 U 11/2018

(Continued)

OTHER PUBLICATIONS

International search report of PCT/CN2022/075664 issued by CNIPA on Sep. 22, 2022.

(Continued)

*Primary Examiner* — Michael D Jennings
(74) *Attorney, Agent, or Firm* — Emerson, Thomson & Bennett, LLC; Roger D. Emerson; Peter R. Detorre

(57) ABSTRACT

A robotic pool cleaner is provided. The cleaner includes: a cleaning body, including a water inlet and a water outlet separate from the water inlet; a driving gear, the driving gear being rotatably provided on the cleaning body; a second tooth segment, the second tooth segment being meshed with the driving gear; and a cleaning roller brush mechanism, including a roller brush body and a roller brush gear; where the brush roller gear is connected to the brush roller body and meshed with the second tooth segment, and when rotating, the driving gear drives the second tooth segment to rotate, to drive the brush roller gear and the brush roller body to rotate relative to the cleaning body.

17 Claims, 5 Drawing Sheets

(56) References Cited

U.S. PATENT DOCUMENTS

| | | | | |
|---|---|---|---|---|
| 2010/0306931 | A1 | 12/2010 | Garti | |
| 2014/0251038 | A1* | 9/2014 | Kumar | E04H 4/1654 74/55 |
| 2018/0172114 | A1* | 6/2018 | Stoltz | F16H 3/06 |
| 2021/0053631 | A1* | 2/2021 | Chen | E04H 4/1654 |

FOREIGN PATENT DOCUMENTS

| | | | |
|---|---|---|---|
| CN | 208380174 | U | 1/2019 |
| CN | 208502343 | U | 2/2019 |
| CN | 110670918 | A | 1/2020 |
| CN | 210178034 | U | 3/2020 |
| CN | 111441619 | A | 7/2020 |
| CN | 112942918 | A | 6/2021 |
| CN | 215254937 | U | 12/2021 |
| CN | 216690524 | U | 6/2022 |
| CN | 218092271 | U | 12/2022 |
| WO | WO2011086270 | A1 | 7/2011 |
| WO | WO2019057968 | A1 | 3/2019 |

OTHER PUBLICATIONS

International search report of PCT/CN2023/116360 issued by CNIPA on Nov. 14, 2023.

European extended search report of EP22925295.2 issued on Jun. 13, 2025.

Examination report No. 1 for standard patent application AU2022439389 issued on Aug. 7, 2025.

* cited by examiner

ROBOTIC POOL CLEANER

CROSS-REFERENCE TO RELATED APPLICATIONS

The present application is a continuation of international application No. PCT/CN2023/116360 filed on Aug. 31, 2023, which claims priority to the U.S. application Ser. No. 17/901,742 filed on Sep. 1, 2022 and entitled "ROBOTIC POOL CLEANER". All of the contents are hereby incorporated by reference in its entire ties.

TECHNICAL FIELD

Embodiments of the present disclosure relate to the technical field of cleaning apparatuses, in particularly to a robotic pool cleaner.

BACKGROUND

A robotic pool cleaner is a type of robotic cleaner designed to meet the need for swimming pool cleaning, capable of repeatedly cleaning the bottom and sidewalls of pools, as well as filtering the water in the pool. During operation, the robotic pool cleaner drives a moving mechanism by using a drive motor, to move across the surface of the pool, and cleans contaminants on the surface of the pool by rolling a roller brush on the surface of the pool.

The existing driving method for the roller brush and the moving mechanism of the robotic pool cleaner is achieved by the roller brush and the drive motor respectively internally meshing with the moving mechanism. This driving method requires high processing precision, and during use, a moving efficiency of the robotic pool cleaner is low, resulting in significant wear on the roller brush, which in turn shortens the service life of the roller brush, and increases use costs of the robotic pool cleaner.

SUMMARY

In order to solve the above problems, embodiments of the present disclosure provide a robotic pool cleaner to at least partially solve the above problems.

A robotic pool cleaner provided according to the embodiments of the present disclosure, including: a cleaning body, including a water inlet and a water outlet separate from the water inlet; a driving gear, the driving gear being rotatably provided on the cleaning body; a second tooth segment, the second tooth segment being meshed with the driving gear; and a cleaning roller brush mechanism, including a roller brush body and a roller brush gear; where the brush roller gear is connected to the brush roller body and meshed with the second tooth segment, and when rotating, the driving gear drives the second tooth segment to rotate, to drive the brush roller gear and the brush roller body to rotate relative to the cleaning body.

Alternatively, the cleaning body is provided with a shaft, and the second tooth segment is sleeved onto the shaft.

Alternatively, the robotic pool cleaner further includes a drive wheel, the drive wheel is connected to the cleaning body, the drive wheel includes a first outer gear ring, the first outer gear ring includes a first tooth segment, the first tooth segment is meshed with the driving gear, and when rotating, the driving gear drives the drive wheel to rotate through the first tooth segment.

Alternatively, the first tooth segment and the second tooth segment are disposed sequentially along an axial direction of the drive wheel from a side facing the cleaning body.

Alternatively, the second tooth segment is configured to be rotatable relative to the first tooth segment, the roller brush gear is externally meshed with the second tooth segment, and when the drive wheel rotates, the second tooth segment rotates in an opposite direction to the first tooth segment, driving the roller brush gear to rotate in a same direction as the drive wheel.

Alternatively, the robotic pool cleaner further includes a transition gear, and the first tooth segment is meshed with the driving gear through the transition gear.

Alternatively, a first transmission ratio between the driving gear and the drive wheel is less than a first set value.

Alternatively, a second transmission ratio between the driving gear and the cleaning roller brush mechanism is 1:1.

Alternatively, the water inlet is a water intake port for sucking in liquid and/or contaminants in a pool, and the water inlet is disposed behind the cleaning roller brush mechanism in a direction of travel of the robotic pool cleaner.

Alternatively, the roller brush body is rotated in a direction for pushing the liquid and/or the contaminants towards the water inlet.

Alternatively, the robotic pool cleaner further includes a track, and the drive wheel further includes a second outer gear ring, a diameter of the first outer gear ring is smaller than a diameter of the second outer gear ring, and the first outer gear ring and the second outer gear ring are coaxially arranged, and the track is sleeved onto the drive wheel and externally meshed with the second outer gear ring.

Alternatively, the robotic pool cleaner further includes a driven wheel, the driven wheel and the drive wheel are spaced apart on the cleaning body and rotatable relative to the cleaning body, the driven wheel includes a third outer gear ring, an inner surface of the track is provided with a plurality of engaging teeth, the track is sleeved outside the drive wheel and the driven wheel, and the engaging teeth are meshed with the second outer gear ring and the third outer gear ring respectively.

A drive motor of a drive mechanism of the robotic pool cleaner serves as a power source to provide power for both a drive wheel assembly and the cleaning roller brush mechanism, enabling the drive wheel of the drive wheel assembly to move, thereby driving the cleaning body to move in the pool. In this way, the cleaning body may clean the contaminants in the pool during movement, achieving cleaning and purification of the pool. Since transmission between the driving gear and the cleaning roller brush mechanism is achieved through the second tooth segment, assembling may be simpler and more convenient, and the demand for processing precision may be reduced, thereby lowering processing costs.

In an embodiment, the second tooth segment is externally meshed with the driving gear.

In an embodiment, the roller brush gear is disposed inside of the driving gear.

In an embodiment, the length of the brush roller gear in the axial direction of the brush roller gear is greater than the length of the driving gear in the axial direction of the driving gear.

BRIEF DESCRIPTION OF THE DRAWINGS

The following accompanying drawings are intended only to schematically illustrate and explain the present disclosure, and do not limit the scope of the present disclosure. In which.

DESCRIPTION OF REFERENCE NUMERALS

Figure 1:
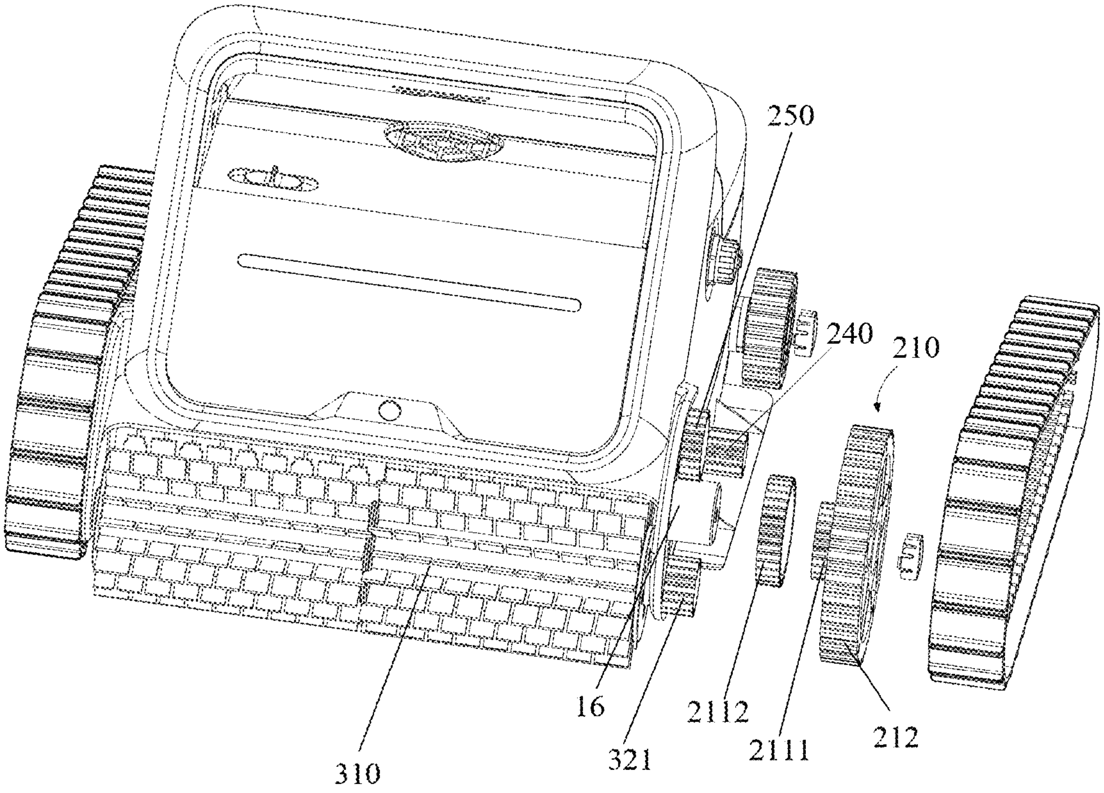
FIG. 1 is a three-dimensional partial exploded schematic diagram of a robotic pool cleaner from a first perspective according to an embodiment of the present disclosure.

1: Robotic pool cleaner; 10: cleaning body; 10*a*: water outlet; 16: shaft; 171: bearing; 172: support rod; 110: upper housing; 120: movable flip cover; 130: bottom housing; 20: drive mechanism; 210: drive wheel; 2111: first tooth segment; 2112: second tooth segment; 212: second outer gear ring; 220: track; 221: engaging teeth; 230: driven wheel; 231: third outer gear ring; 240: driving gear; 250: transition gear; 30: cleaning roller brush mechanism; 310: roller brush body; and 321: roller brush gear.

DETAILED DESCRIPTION

In order to have a clearer understanding of the technical features, objectives and effects of embodiments of the present disclosure, specific embodiments of the embodiments of the present disclosure are described with reference to the accompanying drawings.

As used herein, “schematical” means “serving as an example, instance, or description,” and no illustration or embodiment described herein as “schematical” should be construed as a preferred or more advantageous technical solution.

For the sake of simplicity in the drawings, only parts relevant to the present disclosure are schematically shown in the drawings, and they do not represent their actual structure as products. Also, for the sake of simplicity in the drawings and ease of understanding, in some of the drawings parts having the same structure or function are only schematically depicted as one or more, or only one or more of which are labeled.

Before describing the structure of a robotic pool cleaner of the embodiments of the present disclosure, a brief description of an application scenario of the robotic pool cleaner is provided in conjunction with the accompanying drawings to facilitate understanding.

The embodiments of the present disclosure are mainly directed to improving a drive mechanism of the robotic pool cleaner, to improve a moving efficiency and cleaning effect of the robotic pool cleaner. Before describing the structure of the drive mechanism, an overall structure and operation process of the robotic pool cleaner are briefly described.

A robotic pool cleaner 1 according to embodiments of the present disclosure shown in FIGS. 1-5 mainly includes a cleaning body 10, a drive mechanism 20, and a cleaning roller brush mechanism 30.

The robotic pool cleaner 1 sucks in liquid and/or contaminants through the cleaning body 10, filters the liquid and/or contaminants through the cleaning body 10, retains the contaminants inside the cleaning body 10, and discharges the filtered liquid back into the pool. By repeating this process, filtration of the liquid in the pool is completed. The drive mechanism 20 is connected to the cleaning body 10 to drive the cleaning body 10 to move inside the pool, during operation of the robotic pool cleaner 1. Therefore, while the cleaning body 10 is filtering the liquid and/or the contaminants, as the cleaning body 10 moves in the pool, at least part of the surface of the pool is cleaned by the cleaning roller brush mechanism 30, completing cleaning of the bottom and sidewalls of the pool, thereby achieving the purpose of cleaning the entire pool.

The structure and operation process of the robotic pool cleaner according to the embodiments of the present disclosure are described below in conjunction with the accompanying drawings as follows:

Referring to FIGS. 1-4, the robotic pool cleaner 1 according to embodiments of the present disclosure filters the liquid and/or contaminants in the pool by using the cleaning body 10. The cleaning body 10 includes a housing for mounting the drive mechanism 20, the cleaning roller brush mechanism 30, or the like. In an example, the housing may include an upper housing 110, a movable flip cover 120, and a bottom housing 130. The upper housing 110 is connected to the bottom housing 130, and the upper housing 110 is detachable relative to the bottom housing 130, facilitating cleaning or repairing of components and parts inside the robotic cleaner 1. The movable flip cover 120 is connected to the upper housing 110, and the movable flip cover 120 is rotatable relative to the upper housing 110, facilitating replacement or cleaning of parts inside the cleaning body 10.

In order to be able to suck in the liquid and/or contaminants in the pool, the cleaning body 10 includes a water inlet and a water outlet 10*a*, and the water outlet 10*a* is separate from the water inlet. For example, the water inlet is arranged underneath the bottom housing 130 of the cleaning body 10 as a water intake port, the water outlet 10*a* is arranged on the upper housing 110, and a filter basket 140 is arranged inside the cleaning body 10. The liquid and/or contaminants in the pool enter the interior of the cleaning body 10 through the water intake port disposed at the bottom of the cleaning body 10, flow through the filter basket 140, and leave the contaminants inside the filter basket. The filtered liquid flows out through the water outlet of the upper housing 110 to the outside of the robotic pool cleaner 1 and back into the pool. By repeating this process, cleaning and filtration of the liquid and/or contaminants in the pool is completed.

Alternatively, the above water intake port is provided with a one-way valve to prevent the water flowing into the interior of the robotic pool cleaner 1 from flowing out in the reverse direction and interfering with the water intake, as well as to prevent the contaminants inside from leaking back into the pool through the water intake port.

Preferably, the aforementioned water intake port is disposed behind the cleaning roller brush mechanism 30 in a direction of travel of the robotic pool cleaner 1. In this configuration, it is convenient for the contaminants brushed up by the cleaning roller brush mechanism 30 on the front side of the cleaning body 10 to be sucked in by the water intake port that catches up subsequently as the cleaning body 10 moves, and then to be filtered through the filter basket inside the cleaning body 10, thereby improving a cleaning efficiency of the robotic pool cleaner 1.

Alternatively, in order to improve the efficiency of the robotic pool cleaner 1 in collecting contaminants, the cleaning roller brush mechanism 30 is rotated in a direction for pushing the contaminants towards the water intake port.

When the rotation direction of the cleaning roller brush mechanism 30 coincides with a forward direction of the robotic pool cleaner 10, it facilitates pushing the contaminants brushed up towards the water intake port, further improving the cleaning efficiency of the robotic pool cleaner 1.

Of course, in other embodiments, based on the difference in a relative positional relationship between the cleaning roller brush mechanism 30 and the water intake port, the rotation direction of the cleaning roller brush mechanism 30 may also be opposite to the forward direction of the robotic pool cleaner 1, which is not limited herein.

For example, in an embodiment in which the rotation direction of the cleaning roller brush mechanism 30 is opposite to the forward direction of the robotic pool cleaner 1, the water intake port may be arranged on the upper housing 110, and a suction apparatus interfacing with the water intake port may be arranged in the cleaning body 10. When contaminants on the surface of the pool are brushed up by the cleaning roller brush mechanism 30 and pushed towards the water intake port, they may be sucked into the water intake port under the action of the suction apparatus. After being filtered by the filter basket 140, the contaminants are retained in the filter basket 140, while the filtered liquid is allowed to flow out through the water outlet to the outside of the robotic pool cleaner 1 and back into the pool.

It may be appreciated that in some embodiments of the present disclosure, water intake ports may be provided on both the bottom side and the front side of the cleaning body 10 to increase the efficiency of contaminant collection. In such embodiments, the cleaning roller brush mechanism 30 may be, but is not limited to, reciprocally rotatable relative to the cleaning body 10, such as switching between clockwise rotation and counterclockwise rotation through a gear direction-changing mechanism, thereby performing a cleaning procedure on relatively strongly adhered contaminants on the surface of the pool.

In some embodiments of the present disclosure, the water outlet of the upper housing 110 may allow the water to flow out in a direction substantially perpendicular to the plane of movement of the robotic pool cleaner 1. In this way, the water outlet may provide good thrust for the robotic pool cleaner 1, so that the robotic pool cleaner is pressed firmly against the bottom surface or sidewalls of the pool, not only ensuring reliability when climbing walls (i.e., moving on the sidewalls), but also assisting the robotic pool cleaner 1 in sucking in water to improve the cleaning efficiency.

In addition, a drain port may be provided at the rear of the housing of the robotic pool cleaner 1. When the robotic pool cleaner 1 is removed from the pool, liquid inside the robotic pool cleaner 1 may be discharged through the drain port, reducing the weight of the robotic pool cleaner 1, and facilitating users to lift the robotic pool cleaner 1 out of the water.

Alternatively, the drain port is provided with a one-way valve. With the one-way valve provided in the drain port, sealing of the drain port may be ensured during the operation of the robotic pool cleaner 1, i.e., when the water intake port sucks in the liquid and/or contaminants in the pool, thus avoiding the drain port from interfering with the operation of the robotic pool cleaner.

In an embodiment of the present disclosure, a sealed compartment is provided inside the cleaning body. The sealed compartment is integrated from two sealed housings. A static sealing method is used between the two sealed housings for waterproofing.

Meanwhile, in order to ensure the reliability of the cleaning body 10 during movement, and to protect the parts that operate with electricity, the drive mechanism 20 includes a drive motor, a drive wheel 210, a track 220 and a driven wheel 230, or the like.

The drive motor is provided in the aforementioned sealed compartment, and an output shaft of the drive motor extends from inside of the sealed compartment to the outside of the cleaning body 10. A dynamic sealing structure is used between the output shaft and the sealed compartment to ensure that water does not enter into the sealed compartment. The output shaft passes through the housing and interfaces with the drive wheel 210 of the drive mechanism 20 for transmission.

In an embodiment of the present disclosure, two drive wheels 210 are respectively provided on both sides of the cleaning body 10 in a width direction, and these two drive wheels 210 move independently of each other. If the two drive wheels 210 move in the same direction and at the same speed, the robotic pool cleaner 1 may move forward or backward. If the two drive wheels 210 move at different speeds or in different directions, the robotic pool cleaner 1 may turn.

The drive wheel 210 is provided with the track 220. In such embodiment, the drive wheel 210 includes a first outer gear ring provided around an axis and a second outer gear ring 212 provided around an outer circumferential surface. The second outer gear ring 212 is externally meshed with the track 220, so that the track 220 is driven by the second outer gear ring 212 to drive the cleaning body 10 to move.

In the above specific implementation, the drive motor of the robotic pool cleaner 1 serves as a power source to provide power for the drive wheel 210 and the cleaning roller brush mechanism 30, enabling the drive wheel 210 and the track 220 to move, thereby driving the cleaning body 10 to move in the pool. Meanwhile, during the movement of the cleaning body 10, the cleaning roller brush mechanism 30 rotatably cleans the contaminants on the surface such as the bottom surface and sidewalls of the pool, achieving cleaning and purification of the pool.

In order to tension the track 220, the driven wheel 230 is rotatably provided on the cleaning body 10. The driven wheel 230 and the drive wheel 210 are disposed on the same side of the cleaning body 10 and are spaced apart. The driven wheel 230 includes a third outer gear ring 231, and an inner surface of the track 220 is provided with a plurality of engaging teeth 221. When the track 220 is sleeved outside the drive wheel 210 and the driven wheel 230, the engaging teeth 221 of the track 220 are meshed with the second outer gear ring 212 and the third outer gear ring 213 respectively. In this way, the track 220 may be tensioned through the cooperation between the drive wheel 210 and the driven wheel 230 positioned front and back, thereby ensuring the stability of the robotic pool cleaner 1 during movement.

As shown in FIGS. 1-4, a transmission structure and transmission process of the drive wheel 210 and the cleaning roller brush mechanism 30 with the drive motor are described.

The robotic pool cleaner, in addition to the aforementioned cleaning body 10 and the driving gear 240, further includes a second tooth segment 2112, and the second tooth segment 2112 is meshed with the driving gear 240. The cleaning roller brush mechanism 30 includes a roller brush body 310 and a roller brush gear 321. The brush roller gear 321 is connected to the brush roller body 310 and meshed with the second tooth segment 2112. When rotating, the driving gear 240 drives the second tooth segment 2112 to rotate, to drive the brush roller gear 321 and the brush roller body 310 to rotate relative to the cleaning body 10.

The robotic pool cleaner 1 drives the second tooth segment 2112 externally meshed therewith to rotate through the rotation of the driving gear 240, to drive the roller brush gear 321 externally meshed therewith to rotate, thereby driving the roller brush body 310 to rotate and enabling cleaning of the surface of the pool. Since the driving gear 240 and the second tooth segment 2112 are externally meshed with each other, and the roller brush gear 321 is also externally meshed with the second tooth segment 2112, this external meshing configuration allows for simpler and more convenient assembly, which may reduce the demand for processing precision, thereby lowering processing costs.

The drive wheel 210 includes a first outer gear ring, the first outer gear ring includes a first tooth segment 2111, and the first tooth segment 2111 is meshed with the driving gear 240. When rotating, the driving gear 240 drives the drive wheel 210 to rotate through the first tooth segment 2111.

In some examples, as shown in FIG. 1, the cleaning body 10 is provided with a shaft 16, the first tooth segment 2111 may be directly sleeved onto the shaft 16, and the second tooth segment 2112 is sleeved onto the first tooth segment 2111.

Figure 5:
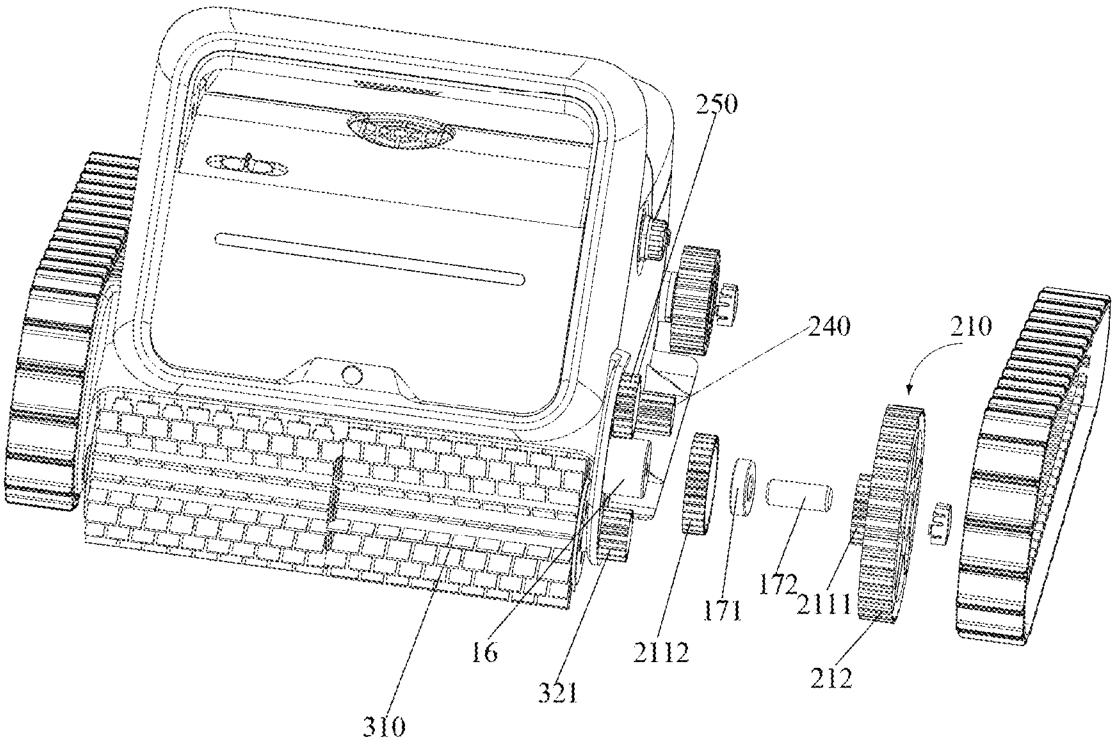
FIG. 5 is a three-dimensional partial exploded schematic diagram of another robotic pool cleaner according to an embodiment of the present disclosure.

In some other examples, as shown in FIG. 5, the cleaning body 10 is provided with a shaft 16, and the second tooth segment 2112 is sleeved onto the shaft 16. The second tooth segment 2112 may be reliably supported and positioned by the shaft 16. A bearing 171 is provided inside the shaft 16, and a support rod 172 is provided through inside the bearing. The first tooth segment 2111 may be rotationally connected to the shaft 16 through the bearing 171. The robotic pool cleaner 1 is externally meshed with the driving gear 240 of the drive motor through the first tooth segment 2111 of the first outer gear ring of the drive wheel 210 for transmission, driving the second outer gear ring 212 of the drive wheel 210 to rotate to achieve movement, so that the robotic pool cleaner 1 may travel a longer distance within a given time of moving, by driving the second outer gear ring 212 having a large diameter to rotate using the first outer gear ring having a small diameter, improving the moving efficiency of the robotic pool cleaner 1, thereby improving the cleaning efficiency. At the same time, since the cleaning roller brush mechanism 30 rolls by externally meshing with the second tooth segment 2112, if a rotational speed of the cleaning roller brush mechanism 30 is the same as the rotational speed of cleaning roller brush mechanisms in the prior art, thus guaranteeing the same cleaning effect, if also given the same moving time, the cleaning roller brush mechanism 30 may clean a longer distance as the robotic pool cleaner 1 travels farther, thereby enabling a higher utilization rate of the cleaning roller brush mechanism 30, reducing the wear on the cleaning roller brush mechanism 30 and improving the service life of the cleaning roller brush mechanism 30 to a certain extent.

In some embodiments of the present disclosure, the first tooth segment 2111 of the first outer gear ring of the drive wheel 210 and the second outer gear ring 212 may be coaxially provided and may be rigidly connected therebetween. When driving the first tooth segment 2111 of the first outer gear ring to rotate, the driving gear 240 of the drive motor enables the second outer gear ring 212 to rotate coaxially with the first tooth segment 2111 of the first outer gear ring at the same rotational speed. A diameter of the first tooth segment 2111 of the first outer gear ring of the drive wheel 210 is smaller than a diameter of the second outer gear ring 212, so that at the same rotational speed, due to its longer circumference, the second outer gear ring 212 drives the cleaning body 10 to move a longer distance, thereby increasing a moving speed of the robotic pool cleaner 1. With an area of the pool unchanged, the increase in the moving speed of the robotic pool cleaner 1 indicates a reduction in the time required to clean the pool once, i.e., the cleaning efficiency is improved.

Further, in order to ensure the efficiency of transmission of the driving gear 240 to the outside, in particular, a first transmission ratio between the driving gear 240 and the drive wheel 210 is less than a first set value. Here, the first transmission ratio refers to a ratio of the rotational speed of an input gear to the rotational speed of an output gear. In this particular example, the first transmission ratio may be the ratio of the rotational speed of the driving gear 240 to the rotational speed of the first outer gear ring. From the definition of the first transmission ratio, it is evident that since the rotational speed of the driving gear 240 is related to the rotational speed of the drive motor, the higher the rotational speed of the first outer gear ring, the smaller the value of the first transmission ratio, assuming that the rotational speed of the drive motor remains constant, i.e., the faster the rotational speed of the first outer gear ring, the faster the moving speed of the cleaning body.

In one feasible approach, the first set value may be 2.5:1 (i.e., 5:2), a transmission ratio that not only may ensure that the moving speed of the cleaning body 10 meets the requirements, and not moving too slowly, but also ensure that the cleaning effect is moderate, and does not result in ineffective cleaning due to excess moving speed.

In an example, the number of teeth on the driving gear 240 of the drive motor ranges from 10 to 15, for example, 13, and the number of teeth on the first tooth segment 2111 of the first outer gear ring ranges from 30 to 35, for example, 32. Of course, the first set value may be other values in other examples.

Figure 2:
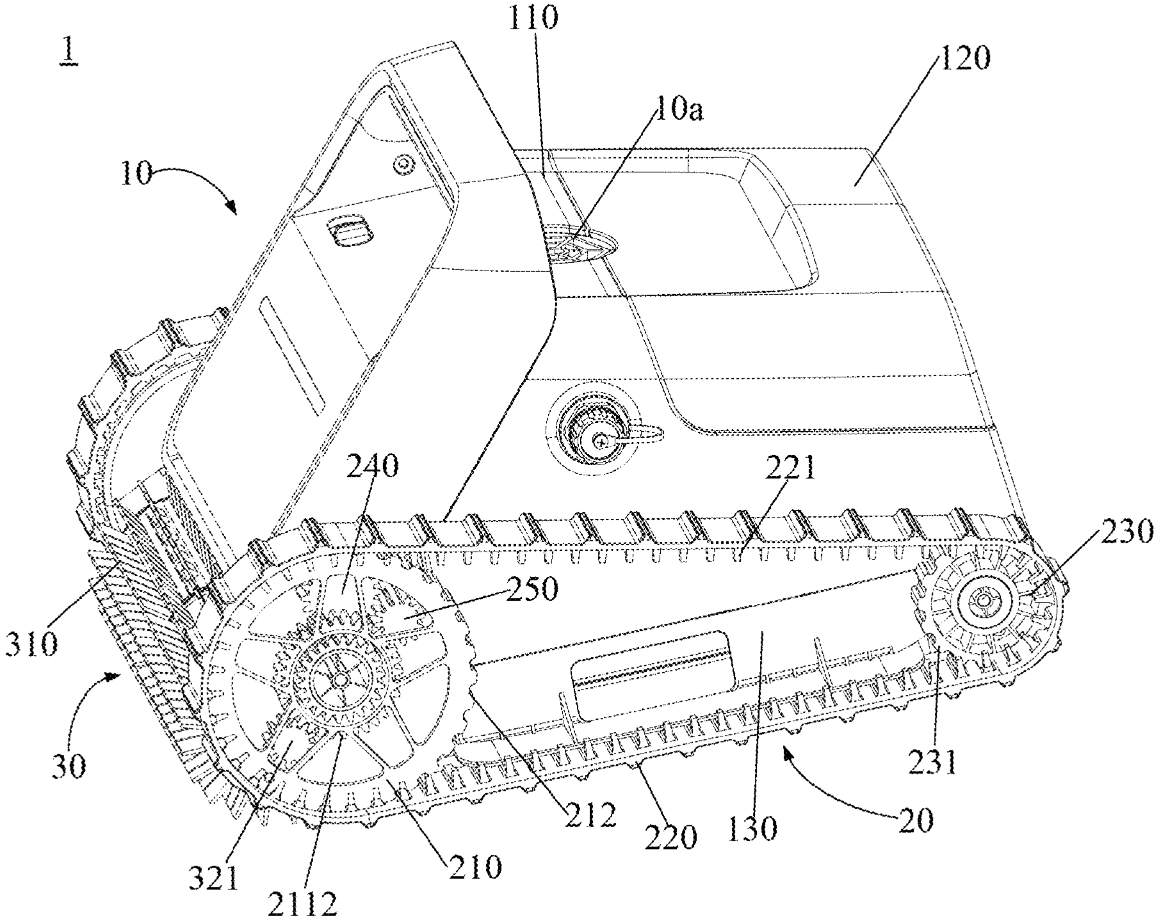
FIG. 2 is a three-dimensional schematic structural diagram of the robotic pool cleaner from a second perspective according to an embodiment of the present disclosure.
Figure 3:
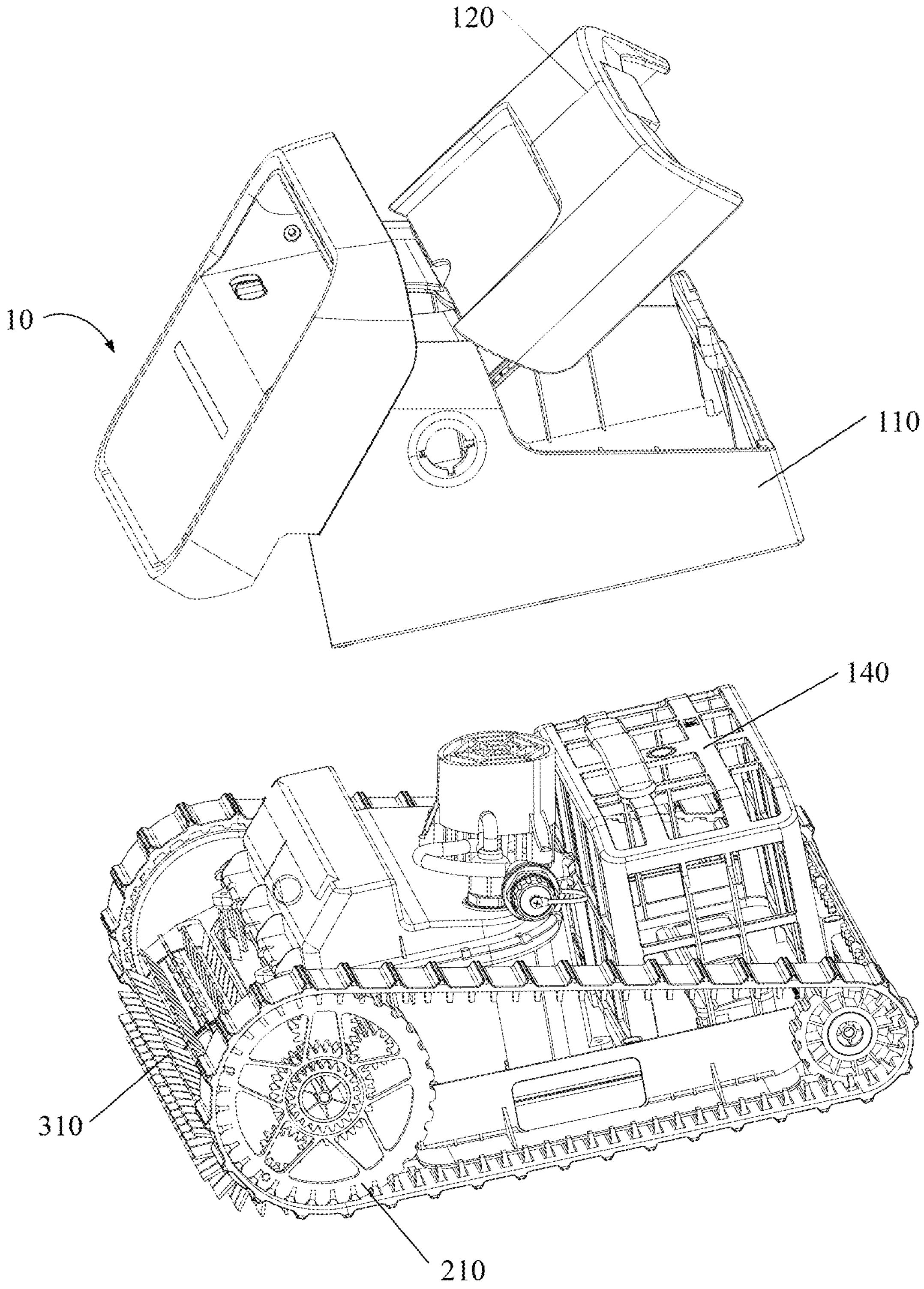
FIG. 3 is a three-dimensional partial exploded schematic diagram of the robotic pool cleaner from a third perspective according to an embodiment of the present disclosure.
Figure 4:
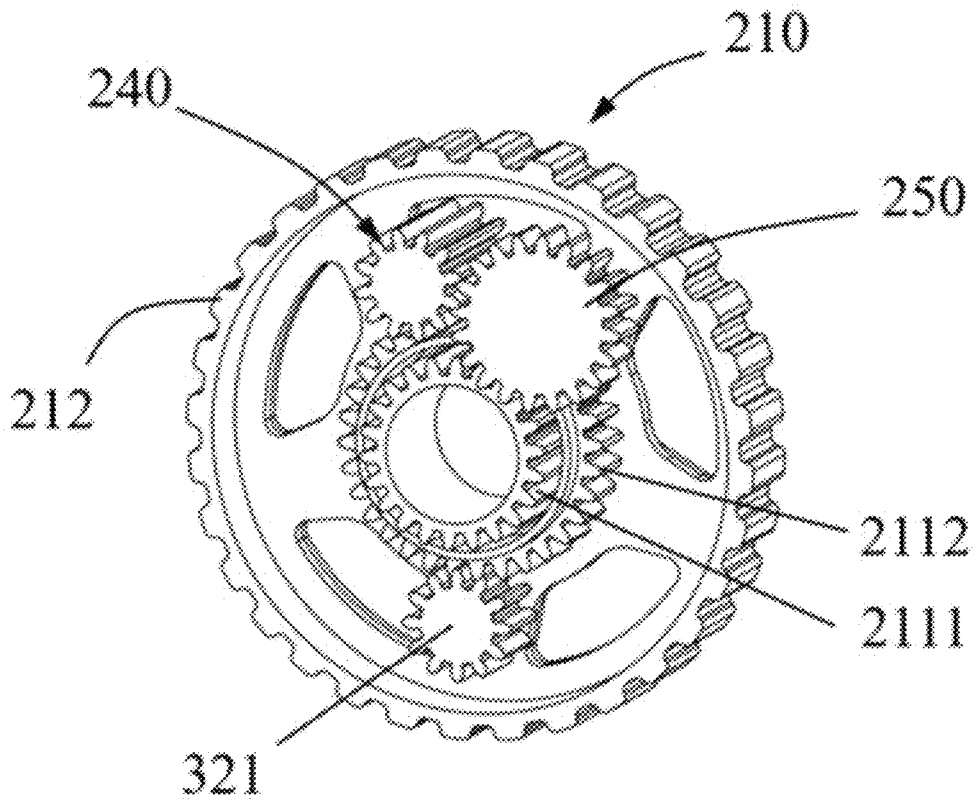
FIG. 4 is a partial exploded diagram of the robotic pool cleaner according to an embodiment of the present disclosure.

As shown in FIGS. 1-3, in an embodiment of the present disclosure, the first tooth segment 2111 and the second tooth segment 2112 are disposed sequentially along an axial direction of the drive wheel 210 from a side facing the cleaning body 10. The diameter of the first tooth segment 2111 may be, but is not limited to, smaller than the diameter of the second tooth segment 2112.

The second tooth segment 2112 is configured to be rotatable relative to the first tooth segment 2111, and the roller brush gear 321 is externally meshed with the second tooth segment 2112. When the drive wheel 210 rotates, the second tooth segment 2112 rotates in the opposite direction to the first tooth segment 2111, driving the roller brush gear 321 to rotate in the same direction as the drive wheel 210.

The robotic pool cleaner further includes a transition gear 250, and the first tooth segment 2111 is meshed with the driving gear 240 through the transition gear 250.

Here, the driving gear 240 is externally meshed with the transition gear 250 and the second tooth segment 2112, respectively. The transition gear 250 is externally meshed with the driving gear 240 and the first tooth segment 2111, respectively.

Therefore, when the driving gear 240 drives the transition gear 250 and the second tooth segment 2112 to rotate, the first tooth segment 2111 is driven to rotate through the transition gear 250 to drive the drive wheel 210 to rotate, as well as the roller brush gear 321 is driven to rotate through the second tooth segment 2112. In this regard, due to counter-rotation of the second tooth segment 2111 and the first tooth segment 2111, a rotation direction of the roller brush gear 321 is adjusted to be coincide with a rotation direction of the drive wheel 210, so as to drive the roller brush body 310 to rotate synchronously in the direction toward the water intake port, facilitating sucking in contaminants by the water intake port for a cleaning and filtration procedure.

In a specific embodiment, a second transmission ratio between the driving gear 240 and the cleaning roller brush mechanism 30 may be 1:1. The second transmission ratio may be a ratio of the speed of the input gear to the speed of the output gear, i.e., the ratio between the rotational speed of the driving gear 240 and the rotational speed of the cleaning roller brush mechanism 30 is the second transmission ratio. A second transmission ratio of 1:1 indicates that the rotational speed of the cleaning roller brush mechanism 30 may be high, meeting the cleaning requirements.

Of course, in other embodiments, the second transmission ratio may be other ratios, which is not limited herein.

In summary, in the embodiments of the present disclosure, the cleaning roller brush mechanism of the robotic pool cleaner is externally meshed with the drive wheel, so that the cleaning roller brush mechanism enables the robotic pool cleaner to have a high overall moving speed without compromising the rotational speed of the cleaning roller brush mechanism, thereby improving the cleaning efficiency.

It should be understood that although this specification is described in accordance with various embodiments, not every embodiment contains only one independent technical solution. This narrative style of the specification is merely for clarity. Those skilled in the art should consider the specification as a whole, and the technical solutions in the embodiments may also be appropriately combined to form other embodiments understandable to those skilled in the art.

The above is only an illustrative and specific implementation of the embodiments of the present disclosure and is not intended to limit the scope of the embodiments of the present disclosure. Any equivalent changes, modifications, and combinations made by those skilled in the art without departing from the concept and principles of the embodiments of the present disclosure shall fall within the scope of protection of the embodiments of the present disclosure.

The invention claimed is:

1. A robotic pool cleaner, comprising:
- a cleaning body, comprising a water inlet and a water outlet separate from the water inlet;
- a driving gear, the driving gear being rotatably disposed on the cleaning body;
- a second tooth segment, the second tooth segment being meshed with the driving gear; and
- a cleaning roller brush assembly, comprising a roller brush body and a roller brush gear,
- wherein the roller brush gear is connected to the brush roller body and meshed with the second tooth segment, and when rotating, the driving gear drives the second tooth segment to rotate, to drive the roller brush gear and the brush roller body to rotate relative to the cleaning body, the cleaning body is provided with a shaft, and the second tooth segment is sleeved on the shaft.

2. The robotic pool cleaner according to claim 1, wherein the second tooth segment is externally meshed with the driving gear.

3. The robotic pool cleaner according to claim 1, wherein the robotic pool cleaner further comprises a drive wheel, the drive wheel is connected to the cleaning body, the drive wheel comprises a first outer gear ring, the first outer gear ring comprises a first tooth segment, the first tooth segment is meshed with the driving gear, and, when rotating, the driving gear drives the drive wheel to rotate through the first tooth segment.

4. The robotic pool cleaner according to claim 3, wherein the first tooth segment and the second tooth segment are arranged sequentially along an axial direction of the drive wheel from a side of the drive wheel facing the cleaning body.

5. The robotic pool cleaner according to claim 4, wherein the second tooth segment is configured to be rotatable relative to the first tooth segment, the roller brush gear is externally meshed with the second tooth segment, and, when the drive wheel rotates, the second tooth segment rotates in an opposite direction to the first tooth segment, driving the roller brush gear to rotate in a same direction as the drive wheel.

6. The robotic pool cleaner according to claim 4, wherein the robotic pool cleaner further comprises a transition gear, and the first tooth segment is meshed with the driving gear through the transition gear.

7. The robotic pool cleaner according to claim 3, wherein a first transmission ratio between the driving gear and the drive wheel is less than a first preset value.

8. The robotic pool cleaner according to claim 7, wherein a second transmission ratio between the driving gear and the cleaning roller brush assembly is 1:1.

9. The robotic pool cleaner according to claim 3, wherein the robotic pool cleaner further comprises a track, and the drive wheel further comprises a second outer gear ring, a diameter of the first outer gear ring is smaller than a diameter of the second outer gear ring, and the first outer gear ring and the second outer gear ring are coaxially arranged, and the track is sleeved onto the drive wheel and externally meshed with the second outer gear ring.

10. The robotic pool cleaner according to claim 9, wherein the robotic pool cleaner further comprises a driven wheel, the driven wheel and the drive wheel are spaced apart on the cleaning body and rotatable relative to the cleaning body, the driven wheel comprises a third outer gear ring, an inner surface of the track is provided with a plurality of engaging teeth, the track is sleeved outside the drive wheel and the driven wheel, and the engaging teeth are meshed with the second outer gear ring and the third outer gear ring respectively.

11. The robotic pool cleaner according to claim 1, wherein the robotic pool cleaner further comprises a drive wheel, the drive wheel is connected to the cleaning body, the drive wheel comprises a first outer gear ring, the first outer gear ring comprises a first tooth segment, the first tooth segment is meshed with the driving gear, and, when rotating, the driving gear drives the drive wheel to rotate through the first tooth segment.

12. The robotic pool cleaner according to claim 11, wherein the robotic pool cleaner further comprises a track, and the drive wheel further comprises a second outer gear ring, a diameter of the first outer gear ring is smaller than a diameter of the second outer gear ring, and the first outer gear ring and the second outer gear ring are coaxially arranged, and the track is sleeved onto the drive wheel and externally meshed with the second outer gear ring.

13. The robotic pool cleaner according to claim 12, wherein the robotic pool cleaner further comprises a driven wheel, the driven wheel and the drive wheel are spaced apart on the cleaning body and rotatable relative to the cleaning body, the driven wheel comprises a third outer gear ring, an inner surface of the track is provided with a plurality of engaging teeth, the track is sleeved outside the drive wheel and the driven wheel, and the engaging teeth are meshed with the second outer gear ring and the third outer gear ring respectively.

14. A robotic pool cleaner, comprising:

a cleaning body, comprising a water inlet and a water outlet separate from the water inlet;

a driving gear, the driving gear being rotatably disposed on the cleaning body;

a second tooth segment, the second tooth segment being meshed with the driving gear; and a cleaning roller brush assembly, comprising a roller brush body and a roller brush gear, wherein the roller brush gear is connected to the brush roller body and meshed with the second tooth segment, and when rotating, the driving gear drives the second tooth segment to rotate, to drive the roller brush gear and the brush roller body to rotate relative to the cleaning body, and the roller brush gear is disposed inside of the driving gear.

15. The robotic pool cleaner according to claim 14, wherein a length of the brush roller gear in an axial direction of the brush roller gear is greater than a length of the driving gear in an axial direction of the driving gear.

16. A robotic pool cleaner, comprising:

a cleaning body, comprising a water inlet and a water outlet separate from the water inlet;

a driving gear, the driving gear being rotatably disposed on the cleaning body;

a second tooth segment, the second tooth segment being meshed with the driving gear; and a cleaning roller brush assembly, comprising a roller brush body and a roller brush gear, wherein the roller brush gear is connected to the brush roller body and meshed with the second tooth segment, and when rotating, the driving gear drives the second tooth segment to rotate, to drive the roller brush gear and the brush roller body to rotate relative to the cleaning body, wherein the water inlet is a water intake port for sucking in liquid and/or contaminants in a pool, and the water inlet is disposed behind the cleaning roller brush assembly in a direction of travel of the robotic pool cleaner.

17. The robotic pool cleaner according to claim 16, wherein the roller brush body is rotated in a direction for pushing the liquid and/or the contaminants towards the water inlet.

* * * * *